Patented June 25, 1946

2,402,642

UNITED STATES PATENT OFFICE 2,402,642

CHEMICAL PROCESSES

Wilbur A. Lazier and Frank K. Signaigo, Wilmington, Del., assignors to E. I. du Pont de Nemours & Company, Wilmington, Del., a corporation of Delaware No Drawing. Application September 24, 1942,
Serial No. 459,538

13 Claims. (Cl. 260—609)

This invention relates to a chemical process and more particularly it relates to a catalytic process for the production of sulfur compounds.

Organic sulfur compounds, especially thiols, have become of considerable industrial importance and methods for obtaining them economically and from readily available raw materials are of considerable utility. Esters of thioacids are a class of readily available sulfur derivatives that in certain cases can be hydrolyzed to produce thiols and other products. More often, however, the hydrolysis of esters of thioacids is not generally useful as a method for preparing thiols.

This invention, accordingly, has as an object to provide an economical process for obtaining thiols. Another object is the preparation of thiols and other valuable sulfur compounds from esters of thioacids. Other objects will be apparent from the following description of the invention.

These objects are accomplished by reacting an ester of a thioacid with hydrogen over a sulfactive hydrogenation catalyst.

In practicing this invention an ester of a thioacid is charged into an autoclave, optionally with a suitable solvent, together with a sulfactive hydrogenation catalyst, as for example, a sulfide of a ferrous group metal. The contents of the autoclave are then agitated and heated under hydrogen at superatmospheric pressure to a temperature at which hydrogenation takes place. The optimum temperature for reaction varies with the particular thioester involved as hereinafter described, but usually a temperature of from 100° to 300° C. is suitable. After the desired degree of hydrogenation is obtained, the autoclave is cooled, the contents filtered to separate the catalyst, and the products are isolated by the usual methods of crystallization, distillation, solvent extraction, etc.

The following examples show in greater detail the practice of this invention. The amounts of materials referred to are expressed as parts by weight, unless otherwise specified.

Example I

Seventy parts of dodecyl thiosulfate (prepared by reacting a dodecyl halide with sodium thiosulfate) is charged into an autoclave together with 100 parts of ethanol and 7 parts of a sulfactive cobalt trisulfide catalyst. Hydrogen is charged into the autoclave to a pressure of 1500 lbs./sq. in., the autoclave is sealed, agitated and heated at 150° C. Rapid reaction ensues, as evidenced by the decrease in pressure and more hydrogen is added from time to time to maintain the pressure within the range of from 2000 to 2500 lbs./sq. in. After two hours of heating, no further hydrogen absorption is noted and the heating is continued for an additional hour to insure completion of the reaction. The autoclave is then cooled and the contents are filtered to separate the catalyst. The clear solution is then diluted with water and extracted with ether. After removal of the ether from the ether extract by distillation, the oily residue is distilled. Thirty-two parts of pure dodecanethiol-1 boiling at 124° C. at 5 mm. are thus isolated. The yield is 82% of theoretical. This reaction may be represented by the following equation:

$$RSSO_3Na + 4H_2 \xrightarrow{catalyst} RSH + NaOH + H_2S + 2H_2O$$

The cobalt trisulfide catalyst used above is prepared as follows:

A solution of 240 parts of sodium sulfide nonahydrate and 64 parts of sulfur in 1500 parts of water is added with stirring to a solution of 240 parts of cobalt chloride hexahydrate in 1500 parts of water. The resulting black precipitate is washed with water until it is substantially free from soluble salts, and then washed with ethanol. The washed precipitate is stored and used as a paste in ethanol.

Example II

Fifty parts of dodecyl thiocyanate is charged into an autoclave together with 100 parts of benzene and 5 parts of a sulfactive cobalt trisulfide catalyst, prepared as described under Example I. The autoclave is then charged with hydrogen at superatmospheric pressure and agitated and heated at 150° C. After two hours no further decrease in pressure is noted and the autoclave is cooled, the contents filtered from the catalyst, and fractionally distilled. There is thus obtained 25 parts of pure dodecanethiol-1 corresponding to a yield of 80%.

The above experiment is repeated, except that 20 parts of sulfur are charged into the autoclave together with the other reactants and the hydrogenation is carried out at 175° C. for four hours. In addition to dodecanethiol-1 there are obtained methanethiol and ammonia as by-products, instead of hydrocyanic acid as in the previous experiment. These reactions may be formulated as follows:

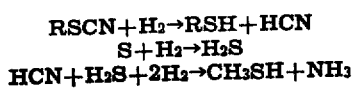

$$RSCN + H_2 \rightarrow RSH + HCN$$
$$S + H_2 \rightarrow H_2S$$
$$HCN + H_2S + 2H_2 \rightarrow CH_3SH + NH_3$$

Example III

Eighty-eight parts of n-butyl thiocaprylate is charged into an autoclave together with 75 parts benzene and 8 parts of a sulfactive molybdenum sulfide catalyst prepared by heating ammonium thiomolybdate. The autoclave is pressured with hydrogen to 1000 lbs./sq. in. pressure, tated and heated to 175° C. During four hours the temperature is gradually increased to 250° C. after which time the autoclave is cooled, the contents filtered from the catalyst and fractionally distilled. After recovery of the benzene solvent there is obtained a substantial proportion of butanethiol-1 and minor proportions of octyl thiocaprylate and unconverted butyl thiocaprylate.

Example IV

One hundred parts of potassium n-butyl xanthate, 100 parts of water and 10 parts of a sulfactive cobalt sulfide catalyst, prepared as described in Example I, are charged into an autoclave which is then pressured with hydrogen and heated at ° C. As the reaction proceeds additional hydrogen is added from time to time to maintain the pressure within the range of from 1000 to 2500 lbs./sq. in. After two hours the autoclave is cooled and the gases bled through a receiver cooled with dry ice. Methanethiol condenses in the receiver. The liquid contents of the autoclave filtered from the solid material present. The solid material is found to consist of the cobalt sulfide catalyst mixed with polymeric thioformaldehyde. The latter can be extracted from the catalyst with boiling dioxane. In addition to the products already mentioned, butanol and higher-boiling thiols are also formed. A possible course of these reactions may be represented by the following equations:

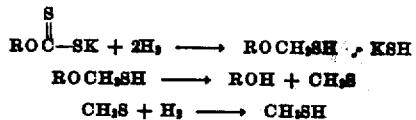

Example V

Fifty parts of O-n-butyl-S-dodecyl dithiocarbonate, prepared from potassium n-butyl xanthate and dodecyl bromide, is charged into a hydrogenation autoclave together with 100 parts of dioxane and 5 parts of a sulfactive cobalt sulfide catalyst, prepared as described in Example I. Hydrogen is charged into the autoclave at 1500 lbs./sq. in. pressure, the autoclave sealed, and heated at 150° C. for 4 hours, after which time no further hydrogen absorption is noted. The contents of the autoclave are filtered from the catalyst and the dioxane is distilled from the reaction mixture. The less volatile material consists of 35 parts of oil, which is identified as dodecanethiol by oxidation to the solid crystalline disulfide melting at 35° to 36° C. This reaction may be formulated as follows:

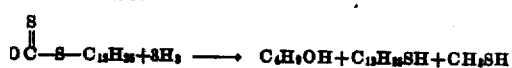

Example VI

One hundred parts of 2-mercaptothiazoline, 100 parts of dioxane, and 10 parts of a sulfactive cobalt sulfide catalyst, prepared as described in Example I, are agitated and heated in a hydrogenation autoclave at 175° C. under 2000 to 2400 sq. in. pressure for 4 hours. Additional hydrogen is added from time to time to replace that absorbed and after the period indicated, the autoclave is cooled and the products are filtered from the catalyst. After removal of the dioxane, the primary product of reaction, beta-aminoethanethiol, a white solid, is sublimed from the reaction mixture under reduced pressure. In addition to this aminothiol there is also obtained a fraction boiling at 40° C. at 5 mm. consisting mainly of thiazoline. The formation of these products presumably occurs according to the following equations:

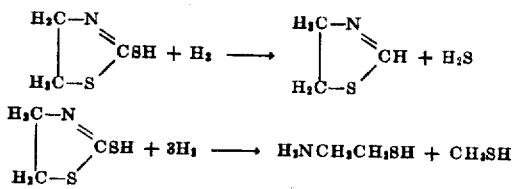

Example VII

One hundred parts of 2-mercaptobenzothiazole, and 100 parts of dioxane are hydrogenated in an autoclave with 10 parts of a sulfactive cobalt sulfide catalyst, prepared as described in Example I, at 125° C. and 1400 to 2200 lb./sq. in. pressure for 5 hours. Considerable hydrogen is absorbed and the pressure is maintained within the specified range by the addition of hydrogen as needed. Distillation of the reaction product yields a yellow oil boiling at 87° to 100° C. at 8 mm. pressure. This oil is found to consist of a mixture in nearly equal proportions of o-aminothiophenol and benzothiazole. The aminothiol is separated from the thiazole by extraction with aqueous alkali and regenerated from the alkaline solution by neutralization with acid. The alkali insoluble thiazole fraction may contain some benzothiazoline. In addition to these products some unconverted mercaptobenzothiazole is recovered.

By operating at 175° C. complete conversion of the mercaptobenzothiazole is accomplished. In addition to the aminothiol and thiazole there is also formed at the higher temperature, some aniline.

Although the foregoing examples have illustrated specific embodiments of this invention, the invention is also applicable to the hydrogenation of other esters of thioacids. In general, these may be represented by the formulae:

wherein R stands either for an aliphatic, alicyclic or aromatic radical and which may contain, in addition to carbon and hydrogen, other functional groups such as hydroxyl, amino, halogen, carboxyl, nitro, mercapto, etc., X represents a mono- or polybasic thioacid radical, and Y represents a polybasic thioacid radical. Specific types of esters of thioacids coming within the scope of the above formulae are the following:

A. Esters of thiosulfuric acid ($RSSO_3Na$, $R_2S_2O_3$). Examples of esters of this type are octyl thiosulfate, dioctyl thiosulfate, dodecyl thiosulfate, octadecenyl thiosulfate, hexamethylene-bisthiosulfate, benzylthiosulfate, N-phthalimidoethyl thiosulfate. The principal product of the hydrogenation of the esters of this type is the corresponding thiol.

B. Esters of thiocyanic acid (RSCN). Specific thiocyanates are butyl thiocyanate, allyl thiocyanate, decamethylene-bisthiocyanate, octadecyl thiocyanate, phenyl thiocyanate, benzyl thiocyanate, p-nitrobenzyl thiocyanate and naphthyl thiocyanates. The hydrogenation of thiocyanates yields the corresponding thiols together with hydrocyanic acid or methanethiol.

C. Esters of carbothioic acids (RCOSR', RSCOR', RCSSR'). Examples of esters of this type which may be hydrogenated according to the process of this invention are vinyl thiolacetate, allyl thiobutyrate, amyl thiocapyrlate, phenyl thioacetate, benzyl hydroxy-thioacetate, ethyl dithioacetate, and butyl thionovalerate. Hydrogenation of carbothioates, according to this invention, yields thiols, esters, aldehydes, and sulfides.

D. Monothiocarbonates (RSCOOM, ROCOSM, RSCOOR', where M=a metal ion). Specific examples of esters of this type are s-cyclohexyl ethyl monothiocarbonate, diethyl monothiocarbonate, sodium phenyl monothiocarbonate, etc.

E. Esters of dithiocarbonic acid (RSCOSM, ROCSSM, RSCOSR'). Included in this group of esters are the xanthates such as potassium ethyl xanthate, potassium dodecyl xanthate, sodium octyl xanthate, sodium cellulose xanthate (viscose), ethyl sorbityl dithiocarbonate, and the like. The hydrogenation of the esters of dithiocarbonic acid according to the process of this invention yields thiols, alcohols, and mercaptomethyl compounds.

F. Esters of trithiocarbonic acid (RSCSSM and RSCSSR'). Examples of trithiocarbonates are dibutyl trithiocarbonate, didodecyl trithiocarbonate, ethylene trithiocarbonate and the like. Hydrogenation of trithiocarbonates according to the process of this invention yields thiols.

G. Esters of monothiocarbamic acid

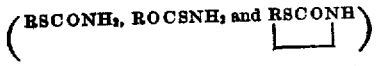

Specific monothiocarbamic esters are: S-octyl thiocarbamate, S - dodecylthiocarbamate, etc. The hydrogenation of monothiocarbamates yields thiols, mercaptomethyl compounds, etc.

H. Esters of dithiocarbamic acid

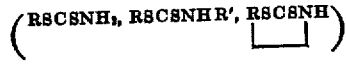

Specific examples of dithiocarbamates are S-octyl dithiocarbamate, N-hexamethylene-bis-ethyldithiocarbamate, and the cyclic N-substituted esters of dithiocarbamic acid, which are known better as mercapto thiazoles or mercapto thiazolines, as for example, 2-mercaptothiazoline, 2-mercaptobenzothiazole. The products of the hydrogenation of the dithiocarbamates include thiols, and, in the case of the cyclic mercaptothiazolines and thiazoles, heterocyclic compounds and aminothiols.

Although not essential in many cases solvents may be employed in carrying out the hydrogenation process. Examples of solvents that may be used are water, and organic solvents such as hydrocarbons, alcohols, ethers, and the like. Instead of or in addition to inert solvents, alkalis, ammonia, amines and acids may be present if desired.

The process of this invention may be operated over a considerable range of temperatures. Generally speaking, a suitable reaction temperature will be found within the range from 100° to 300° C. In the higher temperature range the reaction proceeds more rapidly so usually it is preferred to employ temperatures of at least 125° C. When the desired product of the reaction is that corresponding to complete hydrogenation of the ester of a thioacid employed as starting material, still higher temperatures of the order of 175° to 250° C. are preferred. When it is desired to obtain intermediate reduction products, as for example, mercaptomethyl compounds from the thiocarbonates and thiazoles and thiazolines from the carbamates, it is preferred to hydrogenate at the minimum temperature required for reaction at a practical rate, usually in the neighborhood of 125° to 150° C. For the hydrogenation of esters of thiocarboxylic acids, that is the carbothioates, higher temperatures are required usually above 200° C.

In most cases the reaction proceeds well even at low pressures of hydrogen, but in order to insure a practicable rate of reaction, it is desirable to operate at a hydrogen pressure of at least 100 lbs./sq. in. Purified hydrogen is not essential for the practice of this invention, and instead, hydrogen mixed with other gases, such as nitrogen, hydrogen sulfide, etc., may be used.

By the term "sulfactive hydrogenation catalyst" as used herein and in the claims, we mean a catalyst prepared as described in U. S. Patents Nos. 2,221,804 and 2,230,390, and which is active for the catalytic hydrogenation of the sulfur in organic multisulfides, organic sulfur compounds having carbon to sulfur unsaturation, and organic sulfur compounds having sulfur to oxygen unsaturation.

Examples of sulfactive catalysts that may be used in carrying out the process of this invention are sulfides of the base metals such as chromium, cobalt, copper, iron, lead, molybdenum, nickel, tin, tungsten, and vanadium. It is preferred, however, to use sulfides of the metals cobalt, molybdenum, nickel, and iron, since these have been found to be exceptionally active. Such catalysts may be prepared as described in the copending applications of F. K. Signaigo, Serial Nos. 319,241 and 319,242, filed February 16, 1940, and that of B. W. Howk, Serial No. 353,936, filed August 23, 1940. For example, the metal sulfide may be precipitated from a solution of a metal salt with hydrogen sulfide, a solution of alkali or alkaline earth metal sulfides or polysulfides or with ammonium sulfide or polysulfides. Another method that has been found to yield very active hydrogenation catalysts is to treat the finely divided pyrophoric or activated metal with hydrogen sulfide or sulfur until sulfidation is substantially complete. Other methods for obtaining metal sulfide catalysts include heating powdered metals or metal compounds such as the oxides, carbonates or sulfides with volatile sulfiding agents such as sulfur, hydrogen sulfide, or carbon bisulfide.

The hydrogenating activity of metal sulfides may be increased in many instances by treatment with hydrogen at elevated temperature. The hydrogen treatment of the metal sulfide often can be combined conveniently into a single operation with the hydrogenation reaction for which the catalyst is to be used. Instead of charging the metal sulfide as such it may be formed in situ by placing the finely divided pyrophoric or activated metal in the autoclave together with sulfur or hydrogen sulfide. The metal will then be converted to the active metal sulfide during the early stages of the reaction process. The catalyst employed may be substantially a pure metal sulfide or a combination of metal sulfides. Other substances may be present also as, for example, kieselguhr, alumina, magnesia, carbon, and other supporting or promotor materials.

Usually an amount of sulfactive catalyst of from 1 to 15% by weight of the ester to be converted will produce a satisfactory rate of reaction, although other proportions may be employed as convenient.

The process of this invention may be operated batchwise or in a continuous manner. In the latter case, the catalyst is preferably formed into rigid lumps and the ester, either in the liquid or vapor phase, is passed over the catalyst together with the hydrogen.

By the process of this invention esters of thioacids are economically converted into the more reactive thiols and other valuable sulfur compounds, which find use as intermediates in the manufacture of insecticides, rubber chemicals, dyestuffs, petroleum addition agents, and the like.

As many apparently widely different embodiments of this invention may be made without departing from the spirit and scope thereof, it is to be understood that this invention is not to be limited to the specific embodiments shown and described.

We claim:

1. The process for the production of thiols, which comprises reacting an ester of a thioacid with hydrogen in the presence of a sulfactive hydrogenation catalyst.

2. The process for the production of thiols, which comprises reacting an ester of a thiocyanic acid with hydrogen in the presence of a sulfactive hydrogenation catalyst.

3. The process for the production of thiols, which comprises reacting an ester of a thiocarbamic acid with hydrogen in the presence of a sulfactive hydrogenation catalyst.

4. The process for the production of thiols, which comprises reacting an ester of a dithiocarbamic acid with hydrogen in the presence of a sulfactive hydrogenation catalyst.

5. The process in accordance with claim 4 characterized in that the ester is a cyclic ester of dithiocarbamic acid.

6. The process for the production of beta-aminoethanethiol, which comprises reacting 2-mercapto-thiazoline with hydrogen in the presence of a sulfactive hydrogenation catalyst.

7. The process which comprises reacting an ester of a thiocarbic acid with hydrogen in the presence of a sulfactive hydrogenation catalyst.

8. The process in accordance with claim 1 characterized in that the sulfactive hydrogenation catalyst is a metal sulfide.

9. The process in accordance with claim 1 characterized in that the sulfactive hydrogenation catalyst is a sulfide of a metal of the iron group of the periodic table.

10. The process in accordance with claim 1 characterized in that the sulfactive hydrogenation catalyst is a cobalt sulfide.

11. The process in accordance with claim 1 characterized in that the sulfactive hydrogenation catalyst is a molybdenum sulfide.

12. The process for hydrogenating an ester of a thio acid which comprises reacting said ester with hydrogen in the presence of a sulfactive hydrogenation catalyst.

13. The process in accordance with claim 12 characterized in that the reaction is carried out at a temperature in the range of 100° to 300° C.

WILBUR A. LAZIER.
FRANK K. SIGNAIGO.

Certificate of Correction

Patent No. 2,402,642.     June 25, 1946.

WILBUR A. LAZIER ET AL.

It is hereby certified that error appears in the printed specification of the above numbered patent requiring correction as follows: Column 8, line 12, claim 7, for "thiocarbic" read *thiocarbonic*; and that the said Letters Patent should be read with this correction therein that the same may conform to the record of the case in the Patent Office.

Signed and sealed this 8th day of October, A. D. 1946.

[SEAL]

LESLIE FRAZER,
*First Assistant Commissioner of Patents.* verted will produce a satisfactory rate of reaction, although other proportions may be employed as convenient.

The process of this invention may be operated batchwise or in a continuous manner. In the latter case, the catalyst is preferably formed into rigid lumps and the ester, either in the liquid or vapor phase, is passed over the catalyst together with the hydrogen.

By the process of this invention esters of thioacids are economically converted into the more reactive thiols and other valuable sulfur compounds, which find use as intermediates in the manufacture of insecticides, rubber chemicals, dyestuffs, petroleum addition agents, and the like.

As many apparently widely different embodiments of this invention may be made without departing from the spirit and scope thereof, it is to be understood that this invention is not to be limited to the specific embodiments shown and described.

We claim:

1. The process for the production of thiols, which comprises reacting an ester of a thioacid with hydrogen in the presence of a sulfactive hydrogenation catalyst.

2. The process for the production of thiols, which comprises reacting an ester of a thiocyanic acid with hydrogen in the presence of a sulfactive hydrogenation catalyst.

3. The process for the production of thiols, which comprises reacting an ester of a thiocarbamic acid with hydrogen in the presence of a sulfactive hydrogenation catalyst.

4. The process for the production of thiols, which comprises reacting an ester of a dithiocarbamic acid with hydrogen in the presence of a sulfactive hydrogenation catalyst.

5. The process in accordance with claim 4 characterized in that the ester is a cyclic ester of dithiocarbamic acid.

6. The process for the production of beta-aminoethanethiol, which comprises reacting 2-mercapto-thiazoline with hydrogen in the presence of a sulfactive hydrogenation catalyst.

7. The process which comprises reacting an ester of a thiocarbic acid with hydrogen in the presence of a sulfactive hydrogenation catalyst.

8. The process in accordance with claim 1 characterized in that the sulfactive hydrogenation catalyst is a metal sulfide.

9. The process in accordance with claim 1 characterized in that the sulfactive hydrogenation catalyst is a sulfide of a metal of the iron group of the periodic table.

10. The process in accordance with claim 1 characterized in that the sulfactive hydrogenation catalyst is a cobalt sulfide.

11. The process in accordance with claim 1 characterized in that the sulfactive hydrogenation catalyst is a molybdenum sulfide.

12. The process for hydrogenating an ester of a thio acid which comprises reacting said ester with hydrogen in the presence of a sulfactive hydrogenation catalyst.

13. The process in accordance with claim 12 characterized in that the reaction is carried out at a temperature in the range of 100° to 300° C.

WILBUR A. LAZIER.
FRANK K. SIGNAIGO.

Certificate of Correction

Patent No. 2,402,642.　　　　　　　　　　　　　　　　　　　June 25, 1946.

WILBUR A. LAZIER ET AL.

It is hereby certified that error appears in the printed specification of the above numbered patent requiring correction as follows: Column 8, line 12, claim 7, for "thiocarbic" read *thiocarbonic*; and that the said Letters Patent should be read with this correction therein that the same may conform to the record of the case in the Patent Office.

Signed and sealed this 8th day of October, A. D. 1946.

[SEAL]

LESLIE FRAZER,
*First Assistant Commissioner of Patents.*